(12) United States Patent
McKinney

(10) Patent No.: US 6,813,491 B1
(45) Date of Patent: Nov. 2, 2004

(54) METHOD AND APPARATUS FOR ADAPTING SETTINGS OF WIRELESS COMMUNICATION DEVICES IN ACCORDANCE WITH USER PROXIMITY

(75) Inventor: Aidan Martin McKinney, Newtownabbey (IE)

(73) Assignee: Openwave Systems Inc., Redwood City, CA (US)

( * ) Notice: Subject to any disclaimer, the term of this patent is extended or adjusted under 35 U.S.C. 154(b) by 637 days.

(21) Appl. No.: 09/945,270

(22) Filed: Aug. 31, 2001

(51) Int. Cl.[7] ................................................. H04B 1/06
(52) U.S. Cl. .................................................... 455/414.1
(58) Field of Search ......................... 455/414.1, 456.1, 455/702

(56) References Cited

U.S. PATENT DOCUMENTS

| | | | |
|---|---|---|---|
| 5,067,160 A | * 11/1991 | Omata et al. | 455/249.1 |
| 5,197,489 A | * 3/1993 | Conlan | 455/289.1 |
| 5,604,797 A | 2/1997 | Adcock | |
| 5,774,746 A | * 6/1998 | Kirigaya et al. | 396/49 |
| 5,809,415 A | 9/1998 | Rossmann | |
| 5,812,648 A | 9/1998 | Wanner | |
| 5,892,817 A | 4/1999 | Will | |
| 5,930,351 A | 7/1999 | Lappen et al. | |
| 6,002,763 A | 12/1999 | Lester et al. | |
| 6,049,700 A | 4/2000 | Hardouin | |
| 6,314,306 B1 | 11/2001 | Harris | |
| 6,327,342 B1 | 12/2001 | Mobley et al. | |
| 6,400,814 B1 | 6/2002 | Adams | |
| 6,456,696 B1 | 9/2002 | Fargano et al. | |
| 2003/0005003 A1 | * 1/2003 | Haave et al. | 455/404.01 |

* cited by examiner

Primary Examiner—Creighton Smith
(74) Attorney, Agent, or Firm—Beyer Weaver & Thomas, LLP

(57) ABSTRACT

Improved approaches for adapting settings of wireless communication devices based on estimated proximity to respective users. In accordance with one aspect, one or more settings of a wireless communication device can be automatically altered in accordance with motion (if any) of the wireless communication device. Consequently, settings of the wireless communication device can be dynamically adapted based on the proximity (e.g., motion) of the wireless communication device to its user.

38 Claims, 7 Drawing Sheets

METHOD AND APPARATUS FOR ADAPTING SETTINGS OF WIRELESS COMMUNICATION DEVICES IN ACCORDANCE WITH USER PROXIMITY

CROSS-REFERENCE TO RELATED APPLICATIONS

This application is related to (i) U.S. Application Ser. No. 09/873,117, filed May 31, 2001, entitled "METHOD AND APPARATUS FOR ADAPTING SETTINGS OF WIRELESS COMMUNICATION DEVICES IN ACCORDANCE WITH LOCATION INFORMATION", which is hereby incorporated herein by reference; and (ii) U.S. Application Ser. No. 09/919,762, filed Jul. 31, 2001, entitled "METHOD AND APPARATUS FOR CONTROLLING RINGER CHARACTERISTICS FOR WIRELESS COMMUNICATION DEVICES", which is hereby incorporated herein by reference.

BACKGROUND OF THE INVENTION

1. Field of the Invention

The invention relates to wireless communication devices and, more particularly, to controlling settings of wireless communication devices.

2. Description of the Related Art

With recent advances in technology, mobile phones are able to be "active" continuously for extended periods (e.g., periods of a week or more) without recharging the phone's rechargeable battery. When mobile phones are active, they are able to receive incoming calls. Mobile phones include ringers that notify the user when a call is presently incoming.

Conventionally, mobile phones permit users to manually change the ringer-mode such as to a vibrate-mode or a mute-mode instead of a ring-mode. Hence, when the user of a mobile phone decides that they do not want to be disturbed, they are able to manually interact with the mobile phone to switch the ringer to either the vibrate-mode or the mute-mode. More recently, at least one mobile phone manufacturer has provided their mobile phones with a feature that allows users to define "profiles" for different situations, such that specific ringer tunes, modes or volumes can be used for specific situations. For example, the "profiles" might include normal, silent, meeting and outdoors. Hence, the user is able to interact with the mobile device to select a profile and thus manually switch to a particular profile and thus control the ringer mode. Accordingly, in situations in which users of mobile devices do not want to be interrupted or disturbed (such as while sleeping, during meetings or meal times), the user can interact with the mobile device to turn the ringer off or to switch the ringer to a vibrate mode.

Unfortunately, however, one disadvantage to conventional approaches towards ringer control is that users have to manually deactivate and reactivate the ringer. Often a user will forget to manually control the ringer for given situations. As one example, when a user leaves their mobile phone unattended while it is powered-on, they likely want the ringer to ring when an incoming call arrives. However, with this example, if the user previously set the ringer to a vibrate-mode, then the notification of the incoming call will not be received as the mobile phone will merely vibrate, yet the user is away from the phone and thus does not receive the notification. Users often carry their phone to work, then place it on their desk. Then, as user moves about the office, they leave their phone on their desk. In such situations, particularly given the busy and hectic schedules of users, users cannot always set the ringer mode to the most appropriate setting and thus may miss notification of incoming calls if the ringer is set to an inappropriate mode.

Thus, there is a need for improved approaches to enable greater control over ringers and other aspects of wireless communication devices.

SUMMARY OF THE INVENTION

Broadly speaking, the invention relates to improved approaches for adapting settings of wireless communication devices based on estimated proximity to respective users. In accordance with one aspect of the invention, one or more settings of a wireless communication device can be automatically altered in accordance with motion (if any) of the wireless communication device. Consequently, settings of the wireless communication device can be dynamically adapted based on the proximity (e.g., motion) of the wireless communication device to its user.

The invention is particularly suitable for use with wireless communication devices having constrained keypads and wireless browsers that display documents (e.g., such as markup language documents) or messages to users of the wireless communication devices.

The invention can be implemented in numerous ways, including as method, system, device, and a computer readable medium. Several embodiments of the invention are discussed below.

As a method for altering settings of a mobile device in accordance with motion information, one embodiment of the invention includes at least the operations of: obtaining motion information for a mobile device; determining whether one or more settings of the mobile device should be altered based on the motion information; and altering the one or more settings of the mobile device based on the motion information.

As a method for altering settings of a mobile device, one embodiment of the invention includes at least the operations of: determining whether the mobile device is proximate to its owner; setting one or more mobile device settings in accordance with a first mode when the determining determines that the mobile device is proximate to its owner; and setting the one or more mobile device settings in accordance with a second mode when the determining determines that the mobile device is not proximate to its owner.

As a method for altering settings of a mobile device, one embodiment of the invention includes at least the operations of: receiving a motion indication for the mobile device, the motion indication providing a quantification of the motion that the mobile device has recently undergone; determining from the motion indication whether the mobile device has been stationary for at least a first predetermined period of time; setting one or more mobile device settings to stationary preferences when the determining determines that the mobile device has been stationary for at least the first predetermined period of time; and setting the one or more mobile device settings to active preferences when the determining determines that the mobile device has not been stationary for at least the first predetermined period of time.

As a mobile communication device, one embodiment of the invention includes at least: a display screen; navigation or data entry buttons for facilitating user interaction with the mobile communication device; user preference store that stores user preference information; a motion sensor that detects movement of the mobile communication device; and a notification unit operatively connected to the user preference store and the motion sensor. The notification unit operates to provide notifications to a user of the mobile communication device based on the movement of the mobile communication device detected by the motion sensor.

As a computer readable medium including computer program code for altering settings of a mobile device in accordance with motion information, the computer readable medium includes at least: computer program code for obtaining motion information for a mobile device; computer program code for determining whether one or more settings of the mobile device should be altered based on the motion information; and computer program code for altering the one or more settings of the mobile device based on the motion information.

As a computer readable medium including computer program code for altering settings of a mobile device, the computer readable medium includes at least: computer program code for determining whether the mobile device is proximate to its owner; computer program code for setting one or more mobile device settings in accordance with a first mode when the determining determines that the mobile device is proximate to its owner; and computer program code for setting the one or more mobile device settings in accordance with a second mode when the determining determines that the mobile device is not proximate to its owner.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved approaches for adapting settings of wireless communication devices based on estimated proximity to respective users. In accordance with one aspect of the invention, one or more settings of a wireless communication device can be automatically altered in accordance with motion (if any) of the wireless communication device. Consequently, settings of the wireless communication device are dynamically adapted based on the proximity (e.g., motion) of the wireless communication device to its user.

The settings of the wireless communication device that are adapted can vary. In one embodiment, one or more of the settings pertain to user preferences. The user preferences can pertain to device features or software applications of the wireless communication device. For example, the user preferences can pertain to ringer mode, voice mail greeting, call forwarding, email forwarding, etc.

The invention is particularly'suitable for use with wireless communication devices having constrained keypads and/or wireless browsers that display documents (e.g., such as markup language documents) or messages to users of the wireless communication devices. Examples of such wireless communication devices include mobile telephones, pagers, Personal Digital Assistants (PDA), or small-scale Internet appliances. These wireless communication devices are alternatively referred to as mobile devices or wireless communication devices.

Embodiments of the invention are discussed below with reference to FIGS. 1–6B. However, those skilled in the art will readily appreciate that the detailed description given herein with respect to these figures is for explanatory purposes as the invention extends beyond these limited embodiments.

Figure 1:
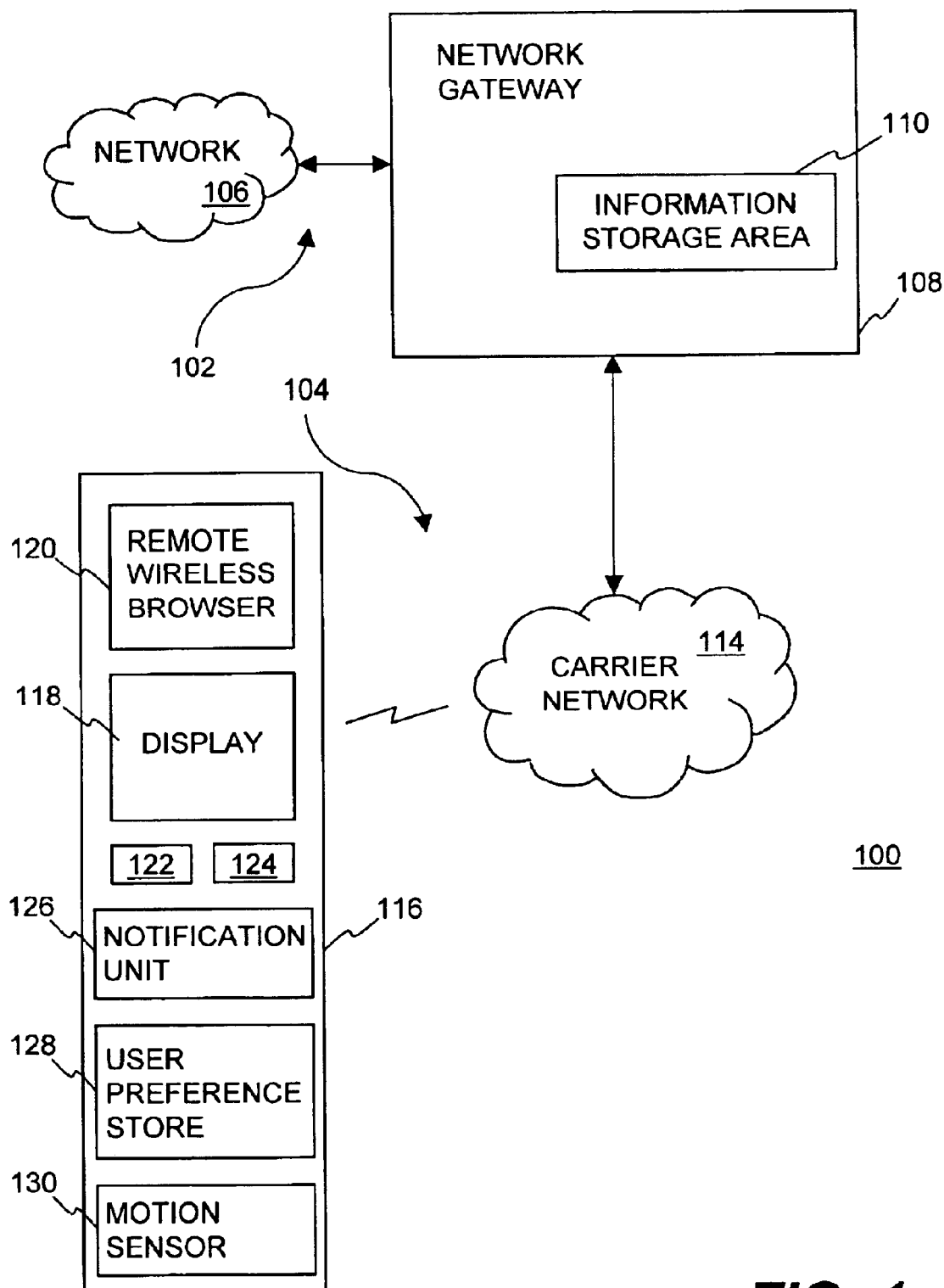
FIG. 1 is a block diagram of a communication system according to one embodiment of the invention.

FIG. 1 is a block diagram of a communication system 100 according to one embodiment of the invention. The communication system 100 adapts settings (e.g., notification settings) in accordance with motion information. The communication system 100 includes a wired section 102 and a wireless section 104. The wired section 102 includes a network 106 and a network gateway 108. In one embodiment, the network 106 is the Internet, which represents a large number of interconnected computers. In another embodiment, the network 106 is an intranet or private network of computers.

The network gateway 108 operates to provide a gateway (link server or proxy server) between the wired section 102 and the wireless section 104. The network gateway 108 will normally perform some protocol translation and other account management and verification operations. The network gateway 108 includes an information storage area 110 that stores account, configuration and other information.

The wireless section 104 includes a carrier network 114 and at least one remote wireless computing device 116. The remote computing device 116 (mobile device) can, for example, be a mobile telephone, a Personal Digital Assistant (PDA), or Internet appliance. Typically, the remote computing device 116 can receive data (from the network 106) over the carrier network 114. The data can, for example, pertain to electronic mail messages, web pages, or documents. Further, when the remote computing device 116 supports voice calls, such voice calls can be received over the carrier network 114.

The remote wireless computing device 116 includes a display 118 for displaying screens or pages of information, a remote wireless browser 120, and navigation buttons 122 and 124. The remote wireless browser 120 is usually an application program that executes on the remote wireless computing device 116. The remote wireless browser 120 is used to access and display the screens or pages of information to be displayed on the display 118. The screens or pages displayed by the remote wireless browser 120 can be or include documents, graphics or forms. A particular screen or page may only display a portion of a document, graphic or form. Forms solicit data entry from users. Forms, like other pages, can be in a markup language format or can take some other format type (e.g., pdf). Markup languages include, for example, HTML, HDML or WML. The navigation buttons 122 and 124 allow a user to navigate through or make selections from menus or lists being displayed on the display 118 by the remote wireless browser 120. The remote wireless computing device 116 can also include other buttons (not shown).

The remote wireless computing device 116 (e.g., mobile telephone) can also include an alphanumeric keypad (not shown) that allows a user to enter alphanumeric information with respect to the remote wireless computing device 116. Such a keypad is not necessary, as alphanumeric information can also be entered, for example, using voice-activation, touchscreens, or a dial screen displayed on the display 118 with selections being made using the navigation buttons 122 and 124 (or other buttons). By interacting with the enhanced remote wireless browser 120, a user is able to access information located on the network 106.

The remote wireless computing device 116 also includes a notification unit 126 and a user preference store 128. The notification unit 126 controls a notification device (e.g., ringer) within the remote wireless computing device 116 to notify its user of incoming calls or data (e.g., electronic mail). The notification unit 126 is often user-accessible (via user interaction with the remote wireless computing device 116) so that the user of the wireless computing device 116 is able to set or view notification settings for the notification device, though some wireless computing devices 116 may not provide access to notification settings or other user preferences. The notification unit 126 also operates in accordance with notification characteristics set for the notification unit 126. These notification characteristics, among other things, can be arranged or configured to vary based on the motion of the remote wireless computing device 116. The notification characteristics being set are stored (e.g., as user preference information) in the user preference store 128.

Further, the remote wireless computing device 116 can, for example, include a motion sensor 130 to detect motion of the remote wireless computing device 116. The detected motion can signify the proximity of the remote wireless computing device 116 to the user. Additionally, other features or aspects of the remote wireless computing device 116 can be set or altered based on the motion of the remote wireless computing device 116 detected by the motion sensor 130. For example, a non-moving remote wireless computing device likely requires less power to operate, so an energy saving mode could be entered on detection of lack of motion for a period of time.

Typically, the wireless section 104 will include a plurality of remote wireless browsers 120, each of which executes on a different wireless remote computing device. The configuration and other information stored in the information storage area 110 can store service limitations, security limitations, preference information, screen configuration information, and the like for each of the remote wireless browsers 120. Each of the different wireless remote computing devices can be uniquely identified to the network gateway 108 by a device identifier.

According to one embodiment, the notification unit 126 is a ringer device incorporated within the wireless communication device. A ringer device, or ringer, as used herein is defined as a device within a wireless computing device (including a wireless communication device) that produces a physical indication to alert a user of an incoming call. The physical indication can, for example, include audio tones or vibrations. These ringer devices can have different ringer modes and/or volume settings. The adaptation of notification settings (e.g., user preferences) for the ringer device causes the ringer characteristics such as ringer mode (e.g., on, mute or vibrate) and/or volume settings to change.

Although the discussion in FIG. 1 focuses largely on notification settings (or ringer mode) for a notification unit (ringer device), it should be recognized that the invention extends beyond controlling settings associated with the notification unit. More generally, the invention pertains to adapting settings of wireless communication devices.

Also, the motion detector 130 could alternatively be replaced with or additionally used with other types of detectors to detect proximity of the remote wireless computing device 116 to its user. For example, pulse or heat detectors.

Figure 2:
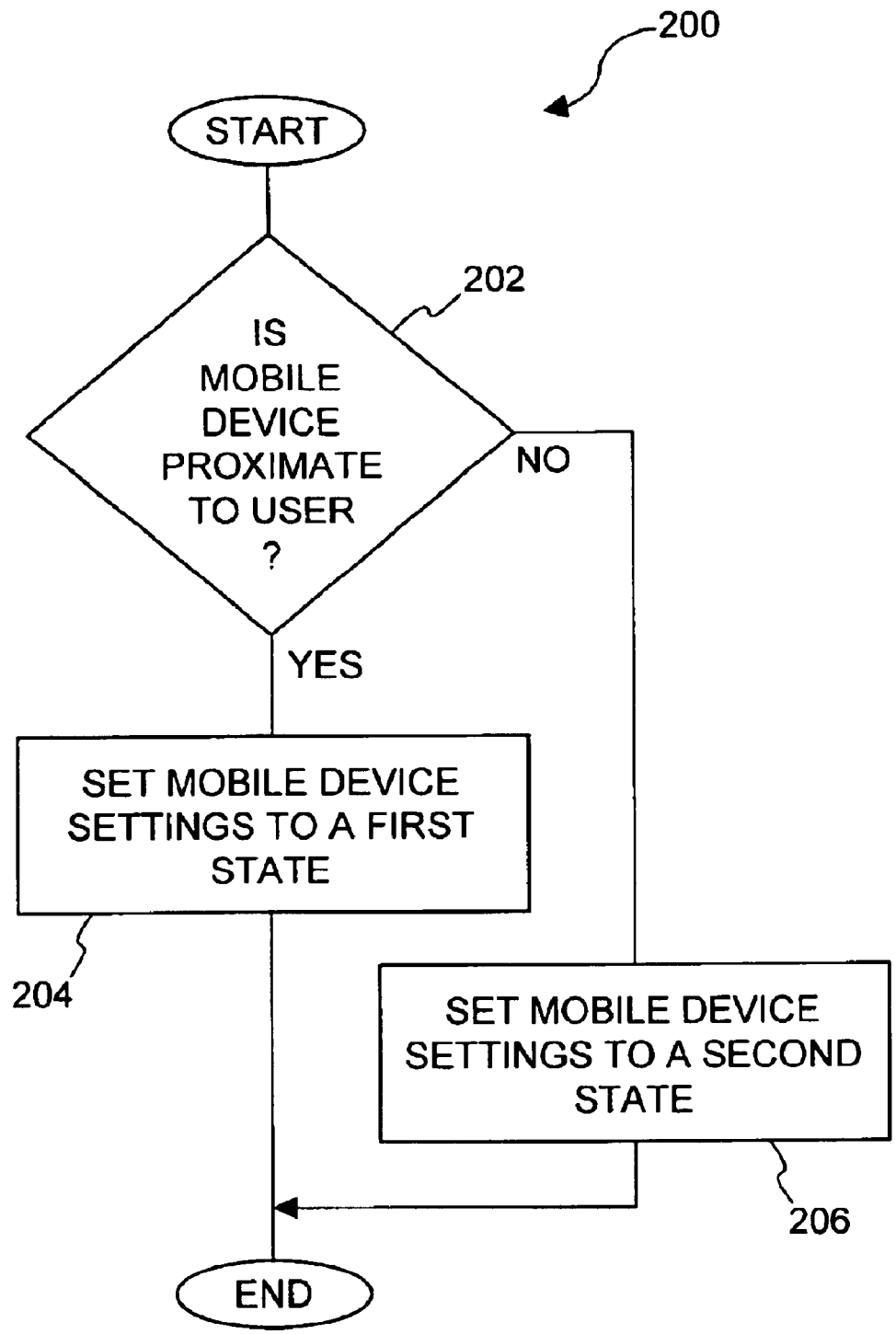
FIG. 2 is a flow diagram of mobile device settings processing according to one embodiment of the invention.

FIG. 2 is a flow diagram of mobile device settings processing 200 according to one embodiment of the invention. The mobile device settings processing 200 is, for example, performed by a mobile device. The mobile device can, for example, be the mobile device 116 illustrated in FIG. 1.

The mobile device settings processing 200 begins with a decision 202 that determines whether the mobile device is proximate to its user. Here, the mobile device is proximate to the user when it is carried or worn by the user. For example, the mobile device would be proximate to the user when being held in the user's hands, clipped to the user's clothing, contained within a bag or case being carried or worn by the user, and the like. The mobile device would not be proximate to the user when the mobile device is set on a desk or other stationary surface. There are a variety of different ways to determine whether the mobile device is proximate to the user. In one embodiment, a motion sensor is utilized to detect whether the mobile device has undergone motion associated with it being carried or worn by the user. In other embodiments, body heat, humidity, pulse or a combination thereof can be utilized. In still another embodiment, the proximity to a particular owner could even be detected such as through some sort of signature. For example, the signature could be a fingerprint, voice-based or some other physical characteristic associated with the owner.

When the decision 202 determines that the mobile device is proximate to the user, then mobile device settings are set 204 to a first state. Here, the mobile device settings are set 204 to the first state which is deemed suitable for the situation in which the mobile device is proximate to the user. For example, when a particular mobile device setting pertains to a notification unit (e.g., ringer) of the mobile device, then the setting of the notification unit to the first state could set the ringer to a vibrate mode. On the other hand, when the decision 202 determines that the mobile device is not proximate to the user, then the mobile device settings are set 206 to a second state. The second state is deemed suitable when the mobile device is not proximate to the user. For example, a particular mobile device setting pertaining to the notification unit can be set to a ring mode (and perhaps even a high-volume ring mode) so that the user who is not proximate to the mobile device can possibly be able hear any notifications. Accordingly, the mobile device settings processing 200 operates to automatically set one or more mobile device settings depending on whether or not the mobile device is proximate to the user.

Following the operations 204 and 206, the mobile device settings processing 200 ends. However, it should be noted that the mobile device settings processing 200 can repeat or can be initiated periodically or as desired.

Figure 3:
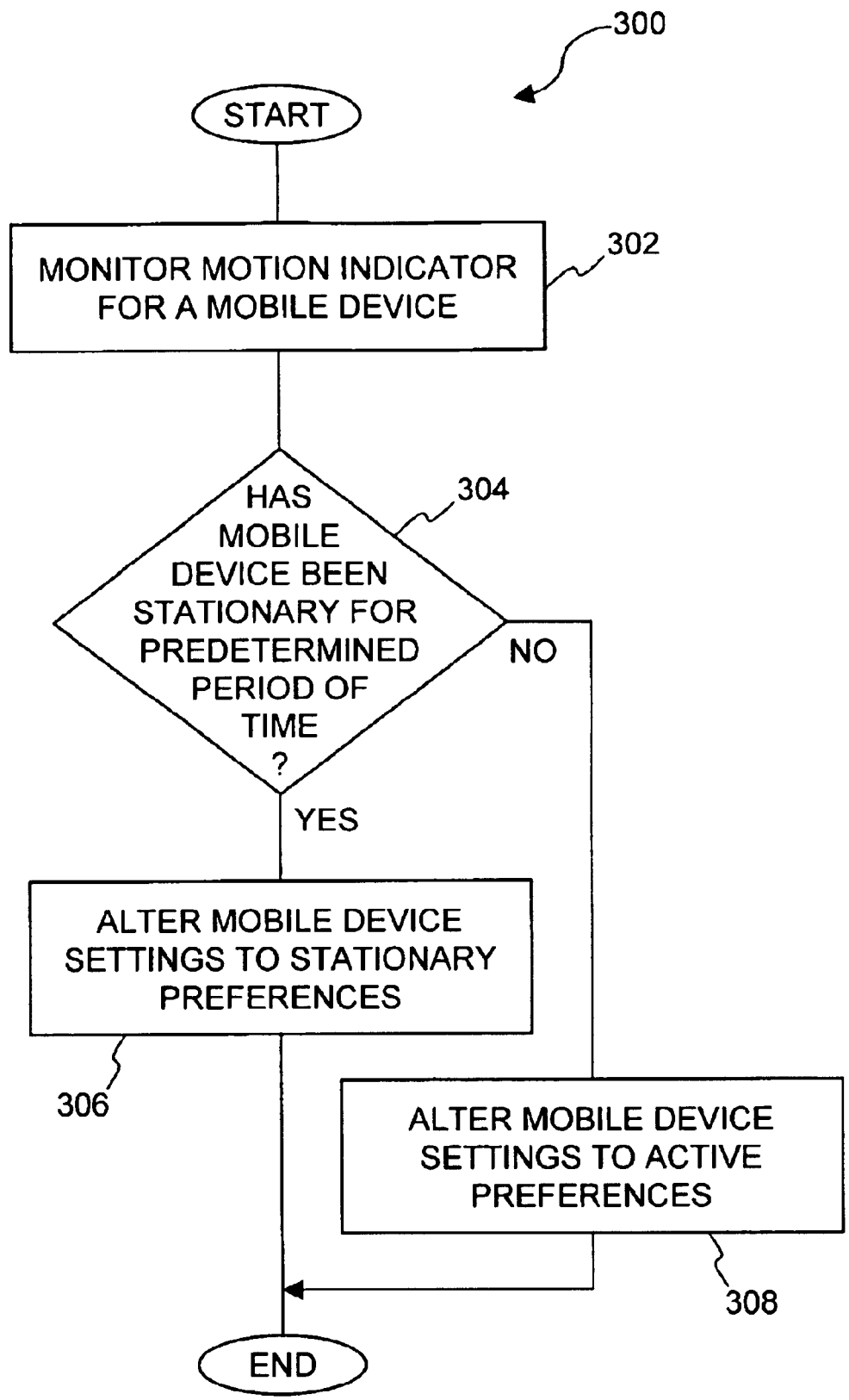
FIG. 3 is a flow diagram of mobile device settings processing according to another embodiment of the invention.

FIG. 3 is a flow diagram of mobile device settings processing 300 according to another embodiment of the invention. The mobile device settings processing 300 is, for example, performed by a mobile device. The mobile device can, for example, be the mobile device 116 illustrated in FIG. 1.

The mobile device settings processing 300 initially monitors 302 a motion indicator for a mobile device. The motion indicator can be implemented in a variety of different ways. For example, the motion indicator can merely provide an indication of motion or no motion, or the motion indicator can indicate a degree or amount of motion for the mobile device.

Next, a decision 304 determines whether the mobile device has been stationary for a predetermined period of time. The predetermined period of time can vary. In one implementation, the predetermined period of time is five (5) minutes. However, it should be noted that various other predetermined periods of time could alternatively be utilized.

When the decision 304 determines that the mobile device has been stationary for the predetermined period of time, then the mobile device settings are altered 306 to stationary preferences. The stationary preferences can, for example, be user provided. Hence, when the mobile device has been stationary for at least the predetermined period of time, the mobile device settings can be altered 306 in accordance with the stationary preferences that have been provided by the user. Typically, a user will desire that a notification unit of the mobile device utilize a ring notification in this case. The ring notification allows the user, who is likely away from the phone, to have the opportunity to hear the notification. For example, if a user has placed their mobile device on a desk within an office, the user is able to hear a ring tone provided by the notification unit even though they are 30 feet away from the mobile device and the desk. The ring notification can also be sent to a particular volume level (e.g., low, medium or high).

On the other hand, when the decision 304 determines that the mobile device has not been stationary for the predetermined period of time, then the mobile device settings are altered 308 to active preferences. The active preferences are typically predetermined by the user. The active preferences indicate the manner in which the mobile device is to operate when the mobile device has not been stationary for the predetermined period of time. In other words, when the mobile device is not stationary, it is active.

In one embodiment, the stationary preferences and the active preferences can be user provided. For example, a user of the mobile device can interact with the mobile device to set the stationary and active preferences. For example, one typical mobile device setting is "notification type" and a user can set a notification type for a stationary situation as well as a notification type for an active situation.

Figure 4:
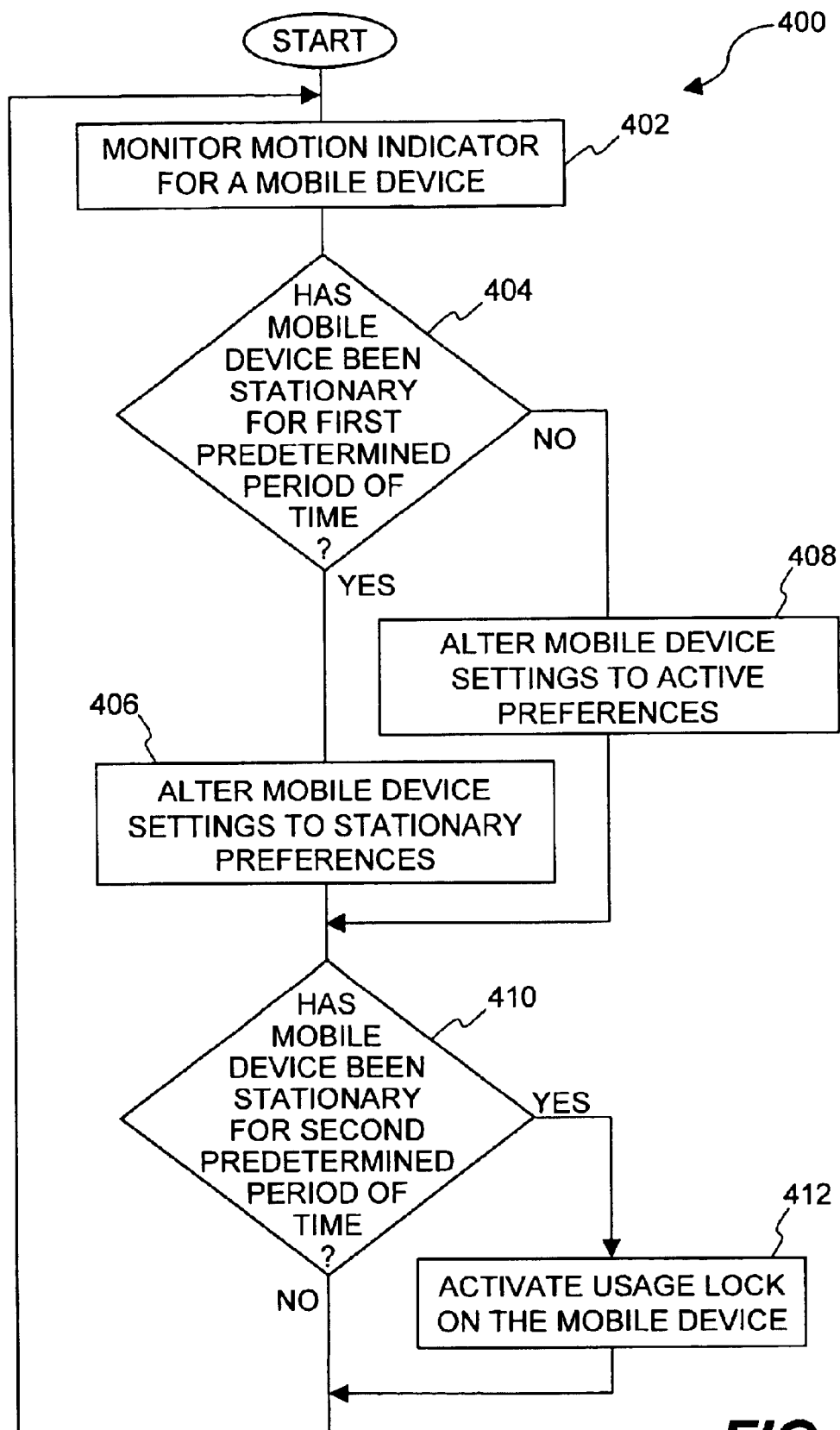
FIG. 4 is a flow diagram of motion-based processing according to one embodiment of the invention.

FIG. 4 is a flow diagram of motion-based processing 400 according to one embodiment of the invention. The motion-based processing 400 is, for example, performed by a mobile device. In one implementation, the mobile device can be the mobile device 116 illustrated in FIG. 1. The motion-based processing 400 can be considered a more detailed embodiment of the mobile device settings processing 300 illustrated in FIG. 3.

The motion-based processing 400 initially monitors 402 a motion indicator for a mobile device. Next, a decision 404 determines whether the mobile device has been stationary for a first predetermined period of time. When the decision 404 determines that the mobile device has been stationary for a first predetermined period of time, then mobile device settings are altered 406 to stationary preferences. Alternatively, when the decision 404 determines that the mobile device has not been stationary for the first predetermined period of time, then the mobile device settings are altered 408 to active preferences.

Following operations 40B and 408, a decision 410 determines whether the mobile device has been stationary for a second predetermined period of time. Typically, the second predetermined period of time is greater than the first predetermined period of time. When the decision 410 determines that the mobile device has been stationary for the second predetermined period of time, then a usage lock on the mobile device is activated 412. In one embodiment, the usage lock is a software lock that attempts to prevent usage of the mobile device by unauthorized users. Once locked, the "unlocking" of the mobile device is typically performed by entering a code (e.g., entering a Personal Identification Number (PIN)). Following the operation 412, as well as following the decision 410 when the mobile device has not been stationary for the second predetermined period of time, the motion-based processing 400 returns to repeat the operation 402 and subsequent operations.

Although the first and second predetermined periods of time can vary considerably depending upon implementation, consider an example in which the first predetermined period of time is 5 minutes and the second predetermined period of time is 10 minutes. In this example, when the motion indicator indicates that the mobile device has been stationary for at least 5 minutes, then the mobile device settings can be altered 406 in accordance with stationary preferences. For example, a notification unit (e.g., ringer) could be set to a ring mode since it is believed that the user is away from the mobile device. Alternatively or additionally, a ring tone and/or volume level could be set. Further, when the mobile device has been stationary for at least 10 minutes, the mobile device can also activate the usage lock so that unauthorized users are restricted from using the mobile device. Here, the activation 412 of the usage lock need only be performed when the usage lock is currently not already activated.

Although not shown in FIG. 4, additional predetermined time periods can be used to activate other features of the mobile device. For example, after a third predetermined period of time (e.g., 30 minutes), the mobile device could enter an energy saving mode. As another example, after a fourth predetermined period of time (e.g., 2 hours), the mobile device can be powered off.

Figure 5:
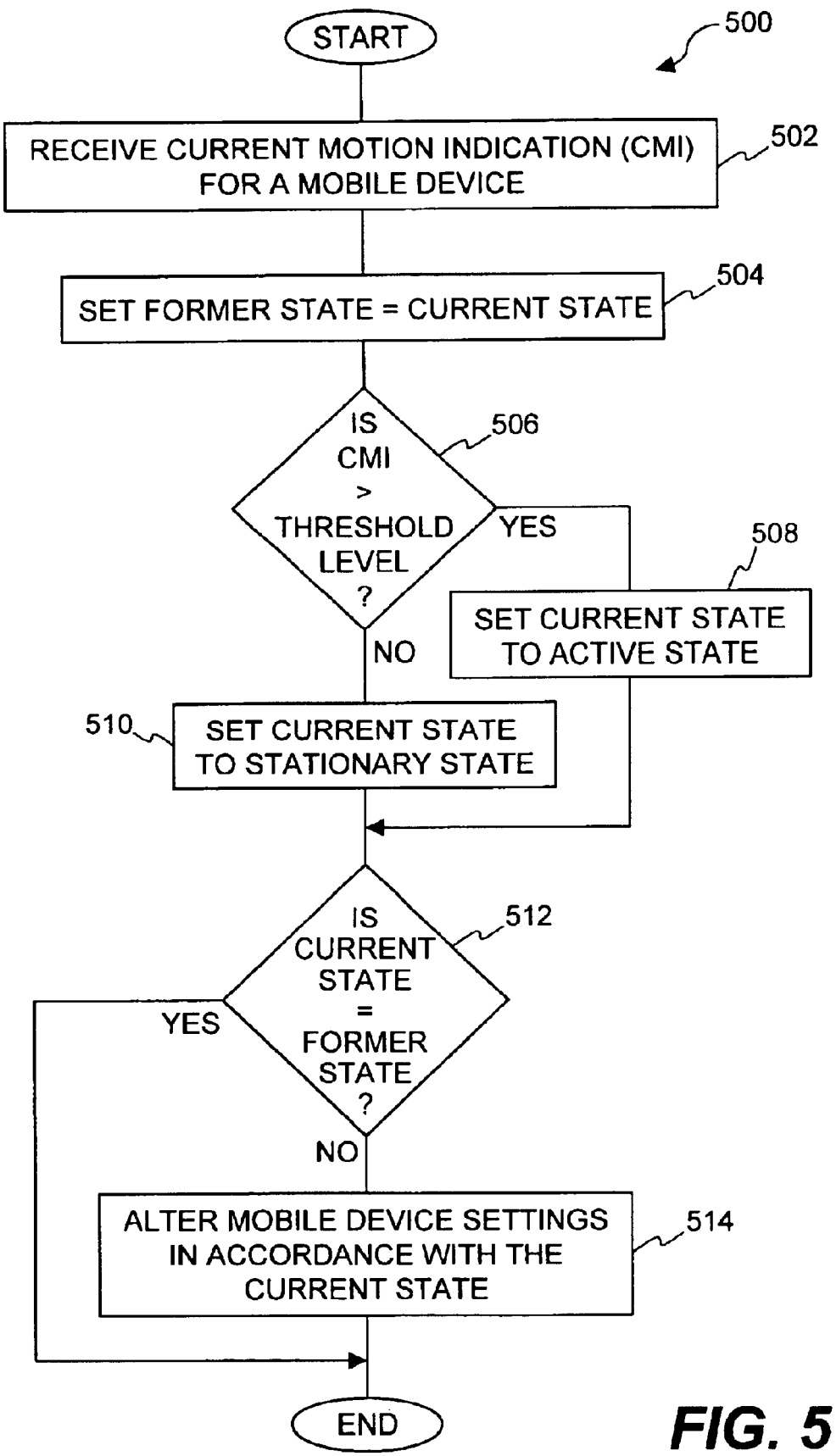
FIG. 5 is a flow diagram of mobile device settings processing according to one embodiment of the invention.

FIG. 5 is a flow diagram of mobile device settings processing 500 according to one embodiment of the invention. The mobile device settings processing 500 is, for example, performed by a mobile device. In one implementation, the mobile device can be the mobile device 116 illustrated in FIG. 1

The mobile device settings processing 500 initially receives 502 a current motion indication (CMI) for the mobile device. Next, the former state is set 504 to the current state. Then, a decision 506 determines whether the CMI is greater than a threshold level. The CMI is a numerical value that represents an amount or degree of motion associated with the mobile device. Typically, the CMI is evaluated over a period of time and can pertain to a maximum motion that occurs within the period of time or can accumulate motion over the period of time. In any case, when the decision 506 determines that the CMI is greater than the threshold level, then the current state is set 508 to an active state. On the other hand, when the decision 506 determines that the CMI is not greater than the threshold level, then the current state is set 510 to a stationary state.

Following the operations 508 and 510, a decision 512 determines whether the current state is equal to the former state. When the decision 512 determines that the current state is not equal to the former state, then mobile device settings are altered 514 in accordance with the current state. Alternatively, when the decision 512 determines that the current state is equal to the former state, then the altering 514 of the mobile device settings is bypassed. Following the operation 514 as well as following the decision 512 when the current state is equal to the former state, the mobile device settings processing 500 ends. However, it should be noted that the mobile device settings processing 500 can continuously repeat, periodically repeat, or be activated as desired.

Figure 6A:
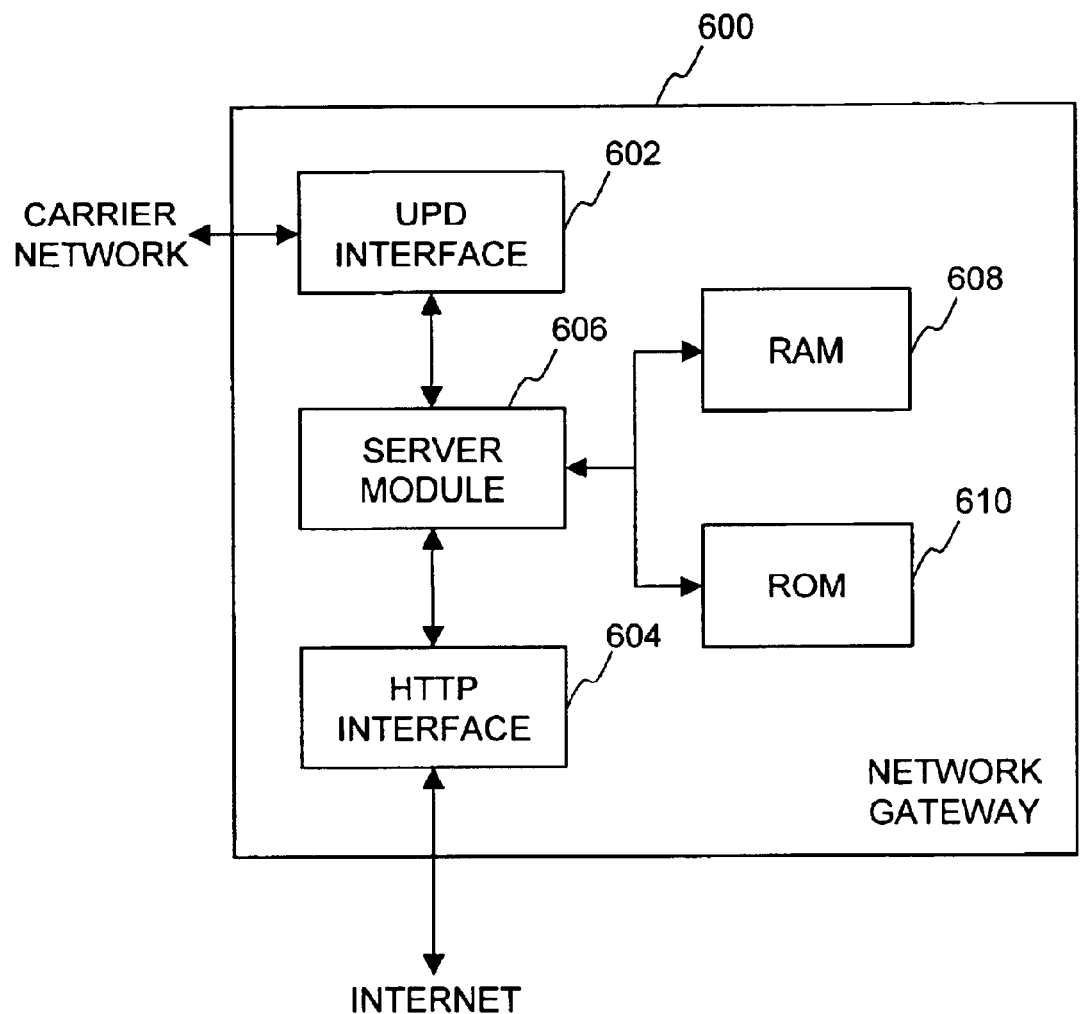
FIG. 6A is a block diagram of a network gateway according to one embodiment of the invention.

FIG. 6A is a block diagram of a network gateway 600 according to one embodiment of the invention. The network gateway 600 can, for example, represent the network gateway 108 illustrated in FIG. 1, which is typically a server computer (server device). To avoid obscuring aspects of the invention, well known methods, procedures, components, and circuitry in the network gateway 600 are not described in detail.

The network gateway 600 may include a User Datagram Protocol (UDP) interface 602 that couples to the carrier network 214, an HTTP interface 604 that couples to the network 106, and a server module 606 coupled between the UDP interface 602 and the HTTP interface 604. The server module 606 performs traditional server processing as well as (if needed) protocol conversion processing. In particular, the protocol conversion processing includes protocol conversion between UDP and HTTP. Further, to assist the server module 606 in its processing, the network gateway 600 includes a random access memory (RAM) 608 and a read-only memory (ROM) 610. Among other things, the RAM 608 can store device identifiers, subscriber identifiers, configuration information, and other data. In one embodiment, such information is stored in the RAM 608 as a database. Also, the RAM 608 can represent the information storage area 110 illustrated in FIG. 1.

Figure 6B:
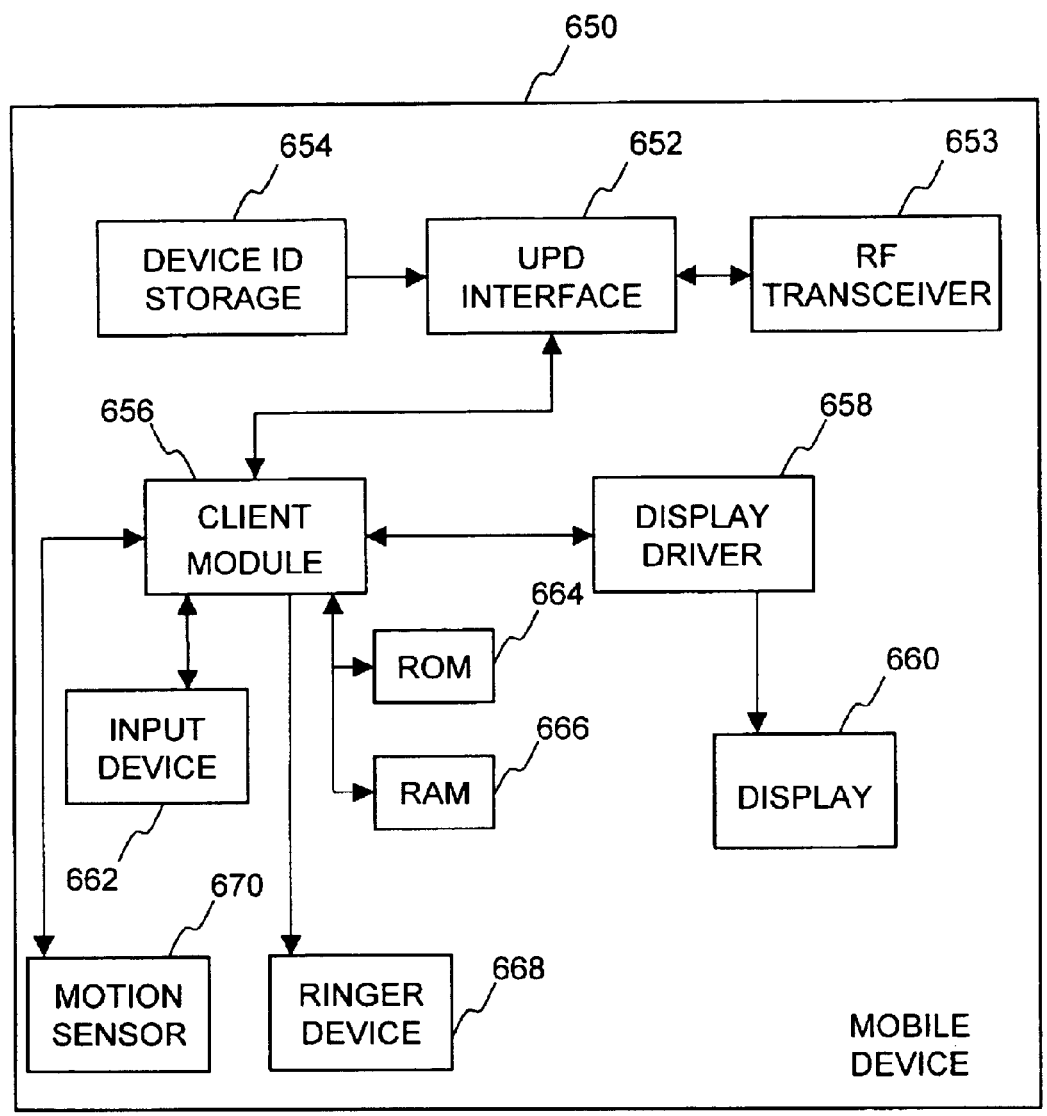
FIG. 6B is a block diagram of a mobile device according to one embodiment of the invention.

FIG. 6B is a block diagram of a mobile device 650 according to one embodiment of the invention. The mobile device 650 can, for example, correspond to the remote wireless computing device 116 that operates the remote wireless browser 120 illustrated in FIG. 1. The mobile device 650 may include a UDP interface 652 that couples to the carrier network 214 via a RF transceiver 653 to receive incoming and outgoing signals. A device identifier (ID) storage 654 supplies a device ID to the UDP interface 652. The device ID identifies a specific code that is associated with a particular mobile device 650. In addition, the mobile device 650 includes a client module 656 that performs many of the processing tasks performed by the mobile device 650, including establishing a communication session with the carrier network 114 and the network gateway 108, requesting and receiving data (e.g., pages, cards) from the network 106, displaying information on a display of the remote computing device, and receiving user input. The client module 656 is coupled to the UDP interface 652 for the establishment of a communication session and the requesting and receiving of data. The client module 656 also couples to a display driver 658 that drives an addressable display 660 having selectable address locations capable of displaying user interface components. The client module 656 controls the display driver 658 to display information on the display 660 to the user. Additionally, the client module 656 is coupled to an input device 662, a ROM 664, and a RAM 666. Preferably, among other things, the client module 656 operates a network browser, such as a Handheld Device Markup Language (HDML) web browser or a Wireless Markup language (WML) web browser. Still further, the client module 656 operates to provide control of notification characteristics (e.g., timer-based or event-based ringer notification processing) and, if supported, a calendar application. The client module 656 can interact with a ringer device 668 to provide notification to a user in accordance with particular notification characteristics. In one embodiment, the client module 656 implements the notification unit 126 of FIG. 1. The input device 662 allows a user of the mobile device 650 to input data and thus make selections in controlling and using the mobile device 650. The ROM 664 stores predetermined data and processing instructions for the client module 656. The RAM 666 is used to provide temporary data storage for incoming and outgoing data being received and transmitted. The RAM 666 can also be used to provide storage for user preferences (e.g., notification (ringer) information). The mobile device 650 also includes a motion sensor 670 that detects motion of the mobile device 650. In one embodiment, the motion sensor 670 supplies the client module 656 with motion information (e.g., motion indication).

Although the embodiments of the network gateway 600 and the mobile device 650 described in FIGS. 6A and 6B are depicted as using UDP and HTTP protocols, it should be recognized that other protocols and other protocol stacks can be provided and utilized. Additional details on the design and construction of the network gateway 600 and the mobile device 650 are contained in U.S. Pat. No. 5,809,415 entitled "METHOD AND ARCHITECTURE FOR AN INTERACTIVE TWO-WAY DATA COMMUNICATION NETWORK," which is hereby incorporated by reference.

The invention is described above as largely being performed in a mobile device. However, the invention can also be performed in a client-server manner. FIG. 1 illustrates a client-server arrangement with the mobile device 116 being the client and the network gateway 108 being the server. For example, the mobile device 116 and the network gateway 108 can interact to perform the invention. In general, the mobile device could inform the network gateway that it is stationary, then the network gateway can determine how it wishes the mobile device to operate and send appropriate instructions to the mobile device to effectuate such operation.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carder waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that settings of mobile devices are able to be automatically adapted in accordance with user proximity (e.g., via motion sensing). Another advantage of the invention is that the probability of answering incoming calls is increased. Another advantage of the invention is that theft deterrence can be provided by a usage lock that can be automatically invoked. Still another advantage of the invention is that mobile devices are able to be more useful and controlled in intelligent, automated ways.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for altering settings of a mobile device in accordance with motion information, said method comprising:
   (a) obtaining motion information for a mobile device;
   (b) determining whether one or more settings of the mobile device should be altered based on the motion information; and
   (c) altering the one or more settings of the mobile device based on the motion information.

2. A method as recited in claim 1, wherein the mobile device is one of a mobile telephone, a pager, and a personal digital assistant.

3. A method as recited in claim 1, wherein said obtaining (a) operates to periodically obtain the motion information.

4. A method as recited in claim 1, wherein the motion information is provided locally within the mobile device.

5. A method as recited in claim 1, wherein the motion information is an indication of whether the mobile device is being carried by a user.

6. A method as recited in claim 1, wherein the mobile device includes at least a motion sensor, and
   wherein said obtaining (a) obtains the motion information from the motion sensor.

7. A method as recited in claim 6, wherein the motion information is a current motion indication, and
   wherein said determining (b) includes at least (b1) comparing the current motion indication with a threshold level, and (b2) determining whether a current state of the mobile device is active or stationary based on said comparing (b1).

8. A method as recited in claim 7, wherein said altering (c) operates to alter the one or more settings of the mobile device in accordance with the current state.

9. A method as recited in claim 8, wherein the current motion indication indicates a degree of movement.

10. A method as recited in claim 1, wherein the one or more settings of the mobile device comprise at least one user preference.

11. A method as recited in claim 1, wherein the one or more settings of the mobile device comprise at least one notification characteristic.

12. A method as recited in claim 1, wherein the mobile device includes a ringer, and
    wherein said altering (c) of the one or more settings of the mobile device operates to set a ringer-mode for the ringer within the mobile device.

13. A method as recited in claim 1, wherein the one or more settings of the mobile device being altered by said altering (c) correspond to one or more user preferences.

14. A method as recited in claim 1, wherein the mobile device includes at least a ringer and at least one motion sensor,
    wherein said obtaining (a) obtains the motion information from the motion sensor,
    wherein the motion information is a current motion indication,
    wherein said determining (b) includes at least (b1) comparing the current motion indication with a threshold level, and (b2) determining whether a current state of the mobile device is active or stationary based on said comparing (b1), and
    wherein said altering (c) of the one or more settings of the mobile device operates to set a ringer-mode for the ringer within the mobile device in accordance with the current state.

15. A method for altering settings of a mobile device, said method comprising:
    determining whether the mobile device is proximate to its owner;
    setting one or more mobile device settings in accordance with a first mode when said determining determines that the mobile device is proximate to its owner; and
    setting the one or more mobile device settings in accordance with a second mode when said determining determines that the mobile device is not proximate to its owner.

16. A method as recited in claim 15, wherein the mobile device is one of a mobile telephone, a pager, and a personal digital assistant.

17. A method as recited in claim 15, wherein said method is periodically performed.

18. A method as recited in claim 15, wherein said determining of whether the mobile device is proximate to its owner operates to estimate whether the mobile device is being carried by a user.

19. A method as recited in claim 15, wherein the mobile device includes a ringer, and
    wherein said setting of the one or more mobile device settings in accordance with the first or second modes operates to alter a ringer-mode for the ringer within the mobile device.

20. A method as recited in claim 19, wherein the mobile device is one of a mobile telephone, a pager, and a personal digital assistant.

21. A method for altering settings of a mobile device, said method comprising:
    (a) receiving a motion indication for the mobile device, the motion indication providing a quantification of the motion that the mobile device has recently undergone;
    (b) determining from the motion indication whether the mobile device has been stationary for at least a first predetermined period of time;
    (c) setting one or more mobile device settings to stationary preferences when said determining (b) determines that the mobile device has been stationary for at least the first predetermined period of time; and
    (d) setting the one or more mobile device settings to active preferences when said determining (b) determines that the mobile device has not been stationary for at least the first predetermined period of time.

22. A method as recited in claim 21, wherein the mobile device includes a ringer, and
    wherein the one or more mobile device settings comprise a ringer-mode setting for the ringer within the mobile device.

23. A method as recited in claim 21, wherein the mobile device is one of a mobile telephone, a pager, and a personal digital assistant.

24. A method as recited in claim 21, wherein the stationary preferences and the active preferences are user-determined preferences for the one or more mobile device settings.

25. A method as recited in claim 21, wherein the one or more settings of the mobile device comprise at least one notification characteristic.

26. A method as recited in claim 21, wherein said method further comprises:
(e) determining whether the mobile device has been stationary for a second predetermined period of time, the second predetermined period of time being greater than the first predetermined period of time; and
(f) activating a usage lock for the mobile device when said determining (e) determines that the mobile device has been stationary for the second predetermined period of time.

27. A method as recited in claim 26, wherein the usage lock prevents usage of the mobile device when activated, and
wherein the usage lock is deactivated to permit usage of the mobile device by entering a code.

28. A method as recited in claim 26, wherein the mobile device includes a ringer, and
wherein the one or more mobile device settings comprise a ringer-mode setting for the ringer within the mobile device.

29. A method as recited in claim 28, wherein the mobile device is one of a mobile telephone, a pager, and a personal digital assistant.

30. A method as recited in claim 29, wherein the stationary preferences and the active preferences are user-determined preferences for the one or more mobile device settings.

31. A mobile communication device, comprising:
a display screen;
navigation or data entry buttons for facilitating user interaction with said mobile communication device;
user preference store that stores user preference information;
a motion sensor that detects movement of said mobile communication device; and
a notification unit operatively connected to said user preference store and said motion sensor, said notification unit operating to provide notifications to a user of said mobile communication device based on the movement of said mobile communication device detected by said motion sensor.

32. A mobile communication device as recited in claim 31, wherein said mobile communication device is one of a mobile telephone, a pager, and a personal digital assistant.

33. A mobile communication device as recited in claim 31, wherein said notification unit comprises a ringer.

34. A mobile communication device as recited in claim 31,
wherein the user preference information includes a first set of user preferences and a second set of user preferences,
wherein said notification unit operates to provide notifications to the user of said mobile communication device in accordance with the first set of user preferences when said motion sensor detects that said mobile communication device has recently undergone movement, and
wherein said notification unit operates to provide notifications to the user of said mobile communication device in accordance with the second set of user preferences when said motion sensor detects that said mobile communication device has not recently undergone movement.

35. A mobile communication device as recited in claim 31, wherein said mobile communication device further comprises a usage lock the usage lock prevents unauthorized usage of said mobile communication device when activated.

36. A mobile communication device as recited in claim 31, wherein said mobile communication device further comprises a wireless browser for interaction with a remote server.

37. A computer readable medium including computer program code for altering settings of a mobile device in accordance with motion information, said computer readable medium comprising:
computer program code for obtaining motion information for a mobile device;
computer program code for determining whether one or more settings of the mobile device should be altered based on the motion information; and
computer program code for altering the one or more settings of the mobile device based on the motion information.

38. A computer readable medium including computer program code for altering settings of a mobile device, said computer readable medium comprising:
computer program code for determining whether the mobile device is proximate to its owner;
computer program code for setting one or more mobile device settings in accordance with a first mode when said determining determines that the mobile device is proximate to its owner; and
computer program code for setting the one or more mobile device settings in accordance with a second mode when said determining determines that the mobile device is not proximate to its owner.

\* \* \* \* \*

UNITED STATES PATENT AND TRADEMARK OFFICE
CERTIFICATE OF CORRECTION

PATENT NO. : 6,813,491 B1  
APPLICATION NO. : 09/945270  
DATED : November 2, 2004  
INVENTOR(S) : Aidan Martin McKinney Page 1 of 1

It is certified that error appears in the above-identified patent and that said Letters Patent is hereby corrected as shown below:

In column 8, line 5, "40B" should be --406--.

In column 10, line 54, "carder waves" should be --carrier waves--.

Signed and Sealed this

Twelfth Day of February, 2008

JON W. DUDAS  
*Director of the United States Patent and Trademark Office*